Jan. 16, 1940. G. P. SCHMITT 2,186,995
CATALYTIC MATERIAL FOR LIGHTERS
Filed Sept. 11, 1936
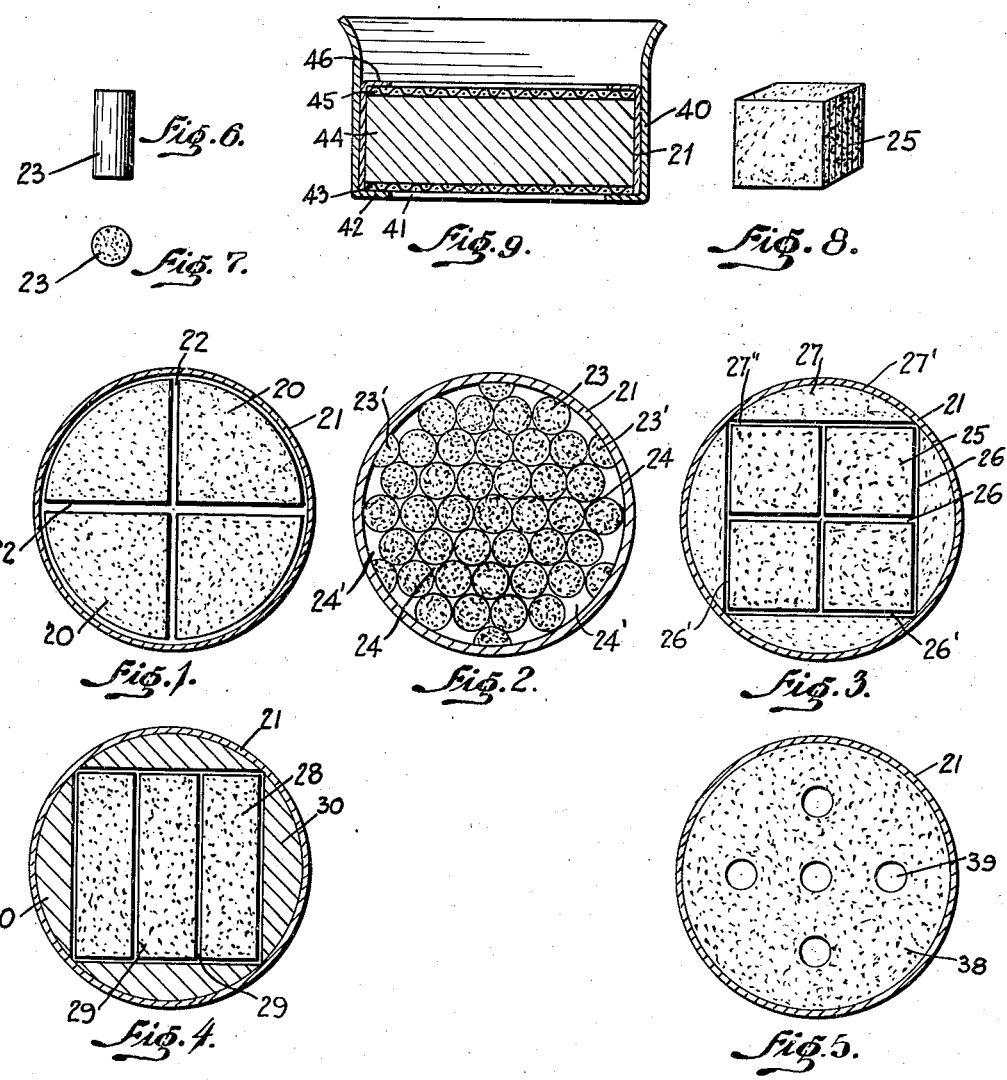
INVENTOR.
George Philip Schmitt.
BY Maxwell E. Sparrow
ATTORNEY.

Patented Jan. 16, 1940

2,186,995

UNITED STATES PATENT OFFICE 2,186,995

CATALYTIC MATERIAL FOR LIGHTERS

George Philip Schmitt, New York, N. Y., assignor, by mesne assignments, to Cardinal Products, Inc., a corporation of New York Application September 11, 1936, Serial No. 100,297

4 Claims. (Cl. 67—7)

This invention relates generally to lighters for use in igniting cigarettes and the like and employing a catalyst which becomes incandescent in coaction with a varporizable fluid, in the presence of air; and in particular, to improvements in the catalyst which heretofore has generally been in the form of a simple pill, pellet or block of platinum black or similar composition with or without perforations.

It is an object of this invention to provide a catalyst for a lighter having one or more parts so arranged and constructed as to offer effective and efficient means for the passage of the mixed vaporizable fluid and air to readily reach the catalyst body for rapid incandescence thereof.

A further object of the present invention resides in the provision of a catalyst unit for a flameless lighter in which the catalyst has a plurality of blocks with gaps therebetween extending substantially throughout the depth of the unit providing passages therethrough for the vapor, the blocks being adjacently arranged with respect to each other and each extending substantially the depth of the unit, the blocks being retained in said relation in a holder.

The above and other objects, purposes and advantages are attained by the novel design, construction and arrangement of parts, as hereinafter described and illustrated in the accompanying drawing, constituting a feature of this disclosure, and in which:

Figs. 1–4 are horizontal sectional views of catalyst for lighters in various forms and arrangements enclosed in a retainer ring shown in section.

Fig. 5 is a top view of a conventional form of catalyst, enclosed in a retainer ring shown in section.

Fig. 6 is an elevational view of one of the catalyst elements shown in Fig. 2.

Fig. 7 is a top view of same.

Fig. 8 is a perspective view of one of the catalyst elements shown in Fig. 3.

Fig. 9 illustrates a holder for the foregoing catalysts.

The catalysts herein described are employable in a lighter holding a vaporizable fluid which is allowed to mix with air admitted into the lighter. The vaporizable fluid mixed with air in the lighter coacts with the catalyst to incandesce the same so that a cigarette, for example, applied to the catalyst becomes ignited when drawn upon.

It has been found that there is a decided advantage in providing a catalyst comprising a plurality of solid elements or sections with passages or spaces therebetween, for the vaporized fluid and air mixture is thereby allowed to get between the elements or sections and to more efficiently and in quick time incandesce the same.

The sections or elements of catalytic material may be of any desired and preferably uniform shapes, such as, for examples, cylindrical, square, oblong or sectors.

Referring more particularly to the drawing which illustrate these examples, Fig. 1 discloses a catalyst for a lighter comprising a plurality of preferably moulded sectors 20 usually consisting of platinum black or other suitable platinum composition. These sectors are contained within an annulus or retainer ring 21 in spaced apart relation, the spaces being indicated by the numeral 22. Spaces or gaps 22 extend substantially throughout the depth of the catalyst unit and permit a ready mixture of vaporized fluid and air to enter the sectors.

Fig. 2 discloses a plurality of cylindrical elements 23 of catalytic material, adjacently arranged, spaces 24 being provided between the elements due to their sectional curvature. Other spaces 24' are formed between the outer elements and retainer ring 21. If it is desired to have these elements in contacting engagement, semi-cylindrical elements 23' may be employed to act as wedges between annulus 21 and the cylindrical elements. Otherwise the cylindrical elements may be loosely arranged within the annulus. Fig. 6 shows an elevational view and Fig. 7 a top view of one of the elements 23.

Fig. 3 discloses a plurality of square tablets or elements 25 of catalytic material having the spaces 26 provided therebetween and extending substantially throughout the depth of the catalyst unit. There may be provided end pieces 27 each having an arcuate side 27' conforming in contour with the curvature of annulus 21 and a straight side 27" spaced from the sides of elements 25 as indicated at 26'. These end pieces may be of any desirable material but are preferably made of catalytic material or of a composition or other material which will readily accept heat from elements 25 when the latter are incandesced. Fig. 8 shows a perspective of one of the elements 25.

In Fig. 4 the catalytic material is disclosed as comprising a plurality of oblong tablets or elements 28 arranged in spaced relation, the spaces being indicated by the numeral 29. These elements may be bounded by and spaced from sections 30 made of suitable material. The sections 30 may constitute a frame fitting in annulus 21 and within which the elements 28 are located.

Fig. 5 shows a conventional catalyst 38 having perforations 39 and is introduced for comparison. It can be readily seen by comparing this catalyst 38 with those hereinabove described that the latter by virtue of the unique construction and arrangement of their parts produce more efficient catalysts, quick to respond to their coaction with the vapor mixture. By having the catalyst comprised of a plurality of elements or sections with spaces, passages or channels between the elements, the vapor mixture may readily get to the parts and heat the catalyst to incandesce in much quicker time than if perforations only such as shown in Fig. 5 were used. Rapid incandescence of the catalyst is necessary for rapid ignition of the applied cigarette which is always demanded.

Fig. 9 shows a form of holder for the catalyst. The holder may comprise an outer shell 40 having a center opening 41 in its bottom surrounded by an annular flange 42. Resting on flange 42 is a perforated plate or screen mesh 43. On top of element 43 is placed the catalyst 44 which may be any of the foregoing forms, and resting on the top surface of catalyst 44 is another perforated plate or screen mesh 45. Between the annular wall of shell 40 and the catalyst 44 is wedged the annulus or retainer ring 21 having the top annular flange 46 bearing against screen 45. This retainer ring fixedly holds the catalyst and screens within shell 40. The wire screen 43 is preferably made of an alloy of nickel and copper, such as what is generally known as "monel" metal. The protective front covering or perforated shield 45 is preferably made of an alloy of nickel and chromium and which may be of the type known in the trade as "nichrome". The retainer ring 21 is preferably made of "monel" metal, or the like.

I am aware that the invention may be embodied in other specific forms without departing from the spirit or essential attributes thereof, and I therefore, desire the present embodiment to be considered in all respects as illustrative and not restrictive; reference being had to the appended claims rather than to the foregoing description to indicate the scope of the invention.

Having described my invention what I claim as new and desire to secure by Letters Patent, is:—

1. A catalyst unit for a lighter of the flameless type comprising a plurality of blocks of catalytic material with gaps between said blocks, the gaps extending substantially throughout the depth of the unit and providing passages therethrough for the vapor, said blocks being adjacently arranged with respect to each other and each extending substantially the depth of said unit, and a holder for said blocks retaining the same in said relation.

2. A catalyst unit for a lighter of the flameless type comprising a plurality of blocks of catalytic material separated by channels, the channels extending substantially throughout the depth of the unit and providing passages therethrough for the vapor to pass to the upper faces thereof, said blocks being adjacently arranged with respect to each other and each extending substantially the depth of said unit, and a holder for said blocks retaining the same in said relation.

3. A catalyst unit for a lighter of the flameless type comprising a plurality of regularly shaped blocks of catalytic material separated by channels, the channels extending substantially throughout the depth of the unit and providing passages therethrough for the vapor to pass to the upper faces thereof, said blocks being adjacently arranged with respect to each other and each extending substantially the depth of said unit, a holder for said blocks retaining the same in said relation, and solid sections of heat-radiating material within the holder adapted to receive heat from the blocks.

4. A catalyst unit for a lighter of the flameless type having a plurality of rectangular elements composed of catalytic material separated by channels, the channels extending substantially throughout the depth of the unit and providing passages for the vapor to pass between said elements, and a holder for said elements retaining the same in said relation.

GEORGE PHILIP SCHMITT.